United States Patent [19]

Okamura et al.

[11] 4,363,739
[45] Dec. 14, 1982

[54] ALUMINUM HYDROXIDE-BASED SPRAY-ON INSULATING MATERIAL FOR BUILDING AND METHOD FOR THE PREPARATION THEREOF

[75] Inventors: Tatsuro Okamura, 4-1, Kusae, Ube-shi, Yamaguchi-ken, Japan; Hideki Irifune, Ube, Japan

[73] Assignees: Tatsuro Okamura; Yoshida Kogyo K.K., both of Japan

[21] Appl. No.: 289,699

[22] Filed: Aug. 3, 1981

[51] Int. Cl.$^3$ .............................................. C04B 43/12
[52] U.S. Cl. ...................................... 252/62; 252/607; 106/15.05; 181/294; 428/920; 428/921
[58] Field of Search ............... 252/62, 607; 106/15.05; 181/294; 428/920, 921

[56] References Cited

U.S. PATENT DOCUMENTS 2,611,694  9/1952  Becher .................................. 92/3
4,132,655  1/1979  Draganov ........................... 252/8.1

Primary Examiner—John E. Kittle
Assistant Examiner—Robert A. Wax
Attorney, Agent, or Firm—Hill, Van Santen, Steadman, Chiara & Simpson

[57] ABSTRACT

The invention provides a novel aluminum hydroxide-based spray-on insulating material which is workable by blowing to form a layer on the ceiling or wall of a building effective for heat and sound insulation. The inventive material is prepared by first blending an organic fibrous material, e.g. reclaimed pulp from scrapped papers, with a gel-like amorphous aluminum hydroxide sludge, available in large quantities as a waste in the anodization treatment of aluminum articles, with adjustment of the pH of the mixture to weakly acidic whereby the organic fibers are entrammeled by the coagulated aluminum hydroxide and then a powdery aluminum hydroxide, which is prepared by drying and pulverizing the gel-like aluminum hydroxide sludge, is admixed with the mixture followed by drying and disintegrating the blend into fluffs. The spray-on insulating material is worked by blowing as such or may be blown together with an adhesive so as to increase the mechanical stability of the insulating layer.

7 Claims, No Drawings

ALUMINUM HYDROXIDE-BASED SPRAY-ON INSULATING MATERIAL FOR BUILDING AND METHOD FOR THE PREPARATION THEREOF

BACKGROUND OF THE INVENTION

The present invention relates to a spray-on insulating material for building or, more particularly, to a material for building which is suitable for working to form a thick layer for heat and sound insulation on ceilings and walls by spraying thereto by use of a spray gun or blower gun as well as a method for the preparation of such a spray-on insulating material for building.

Needless to say, most of the modern buildings are provided with heat and sound insulating layers on the walls, ceilings and floors in order to enhance comfortableness of living as well as to save energies required for the temperature control of the building space. A wide variety of insulating materials are currently on use in accordance with the nature of the particular building and locality. For example, one of the most popular methods for heat and sound insulation in living houses is to apply a glasswool mat or a slab of cellular foamed plastic to the wall and the like.

These prior art materials for building insulation of heat and sound have their own respective disadvantages not only in the performance and workability in building construction but also in the expensiveness. In respect of the workability of the insulating material, there recently is a demand for a material suitable for forming a thick insulating layer on the ceiling or wall of a building ready-built or on the way of construction by the method of spraying with a spray gun.

Various kinds of such spray-on insulating materials for building are currently on the market. Most of these commercially available spray-on insulating materials are manufactured with cellulosic fibers as the base material. Unfortunately, none of them is quite satisfactory, in particular, in connection with insufficient non-inflammability or flame retardancy as an unavoidable consequence of the use of the organic fibrous material as well as the expensiveness. Therefore, there has been an eager desire to develop an inexpensive spray-on insulating material for building exhibiting excellent performance and workability.

Turning now to the problem of possible materials utilizable as a component of such a spray-on insulating material for building, it is an idea that, if an otherwise useless or rather noxious material such as an industrial waste material can be utilized and processed into such a building material, two-way advantages can be obtained in the disposal of the noxious waste material and in the commercial benefit with the production of useful building materials. Of course there have been made various attempts for the production of building materials by utilizing industrial waste materials but unfortunately there are known very few examples of commercial success.

The inventors have also continued extensive investigations for manufacturing a spray-on insulating material for building by utilizing industrial waste materials otherwise useless or rather noxious to cause environmental pollution and arrived at a conclusion that the gel-like aluminum hydroxide-containing sludge produced in large quantities in the aluminum processing industry is the most promising material for such a purpose.

To give an overview of the industries involving a serious problem of waste disposal to avoid environmental pollution, the works of aluminum fabrication are typically notorious due to the difficulties in the waste disposal. As is well known, aluminum articles in recent years are rarely used as shaped by extrusion, casting or other shaping means with the metallic aluminum surface exposed but almost always used after certain surface finishing.

The method of surface finishing of aluminum articles most widely undertaken in the aluminum industry is, of course, the surface anodization in which the surface of the aluminum article is electrolytically oxidized in an acidic electrolyte bath to be covered with a thin but dense layer of aluminum oxide and imparted with increased chemical and physical stability as well as beautifulness. A problem in the anodization treatment of aluminum articles is that a considerable amount of the aluminum metal is unavoidably dissolved both in the alkaline cleaning solution for degreasing before the anodization and in the acidic solution for anodizing electrolysis and the aluminum constituent thus contained in these solutions as well as in the washing water following the treatment is finally precipitated in the form of amorphous aluminum hydroxide when these solutions are mixed together and neutralized for sewage disposal.

The amorphous aluminum hydroxide thus precipitated usually forms a gel-like sludge containing considerable amounts of impurities coming from several steps of the aluminum fabrication such as sulfates, e.g. aluminum sulfate, aluminum hydroxysulfate, sodium sulfate and the like, and sodium aluminate. The gel-like aluminum hydroxide sludge contains large volumes, e.g. 70 to 90% by weight, of water but is hardly filtrable so that handling of such a material is extremely difficult. Therefore, the only way in the prior art for the disposal of such a gel-like aluminum hydroxide sludge is to discard it in a reclaimed land or in the ocean in the gel-like form as such.

Such a method of waste disposal is, of course, not quite acceptable even by setting aside the problem of the large cost for the transportation of such a waterish material to the reclaimed land or off to the ocean. For example, a reclaimed land filled with such a gel-like sludge is naturally weak in the yield strength of the ground resulting in a decreased utilizability of the land. Discarding of the sludge in the ocean is also not free from regulations to prevent pollution of water. Thus the waste disposal of the gel-like aluminum hydroxide sludge has been the most troublesome problem in the industry of aluminum fabrication.

SUMMARY OF THE INVENTION

It is therefore an object of the present invention to provide a novel spray-on insulating material for building with good workability and exhibiting excellent performance in the power of insulating heat and sound as well as in the non-inflammability or flame retardancy simultaneously giving a way for the waste disposal of the gel-like aluminum hydroxide sludge produced in large quantities in the aluminum industry leading, as a consequence, to the outstanding inexpensiveness of the resultant product of the spray-on insulating material.

The spray-on insulating material of the present invention is a disintegrated fluffy material of a dried blend comprising a gel-like aluminum hydroxide sludge, an organic fibrous material entrammeled by the gel-like aluminum hydroxide sludge and a powder of aluminum hydroxide obtained by drying and pulverization of the gel-like aluminum hydroxide sludge.

The above described spray-on insulating material for building of the present invention is manufactured by first blending the gel-like aluminum hydroxide sludge and the organic fibrous material to form a mixture which is then weakly acidified to a pH of 4 to 6 by adding a small amount of an inorganic acid and the thus obtained weakly acidic mixture is then admixed with the separately prepared powdery aluminum hydroxide. The thus prepared blend is dried and disintegrated into fluffs suitable for spraying with a spray gun.

DETAILED DESCRIPTION OF THE PREFERRED EMBODIMENTS

As is clear from the above description, the inventive spray-on insulating material is composed of an amorphous aluminum hydroxide and an organic fibrous material as the essential components thereof. It is essential in the present invention, however, that the aluminum hydroxide component is admixed with the organic fibrous material partly as a gel-like aluminum hydroxide sludge in wet and partly as a dry powder prepared in advance by drying and pulverizing the sludge. The powdered aluminum hydroxide must be admixed with the mixture of the gel-like aluminum hydroxide sludge and the organic fibrous material.

The weight proportion of these components, i.e. the organic fibrous material, the gel-like aluminum hydroxide in the sludge and the powdered aluminum hydroxide, naturally is determined in accordance with various parameters including the requirements for the finished product of the spray-on insulating material. Typical percentages of them are, for example, from 15 to 25% of the fibrous material, from 3 to 5% of the gel-like aluminum hydroxide sludge calculated as dry and from 70 to 80% of the powdery aluminum hydroxide.

Various kinds of organic fibrous materials are suitable for use in the present invention including fibrous flues of cotton, wool and other synthetic fibers obtained in fiber-processing factories such as spinning and weaving plants, wood pulp and the like. The fibers desirably have a length as large as possible. The most preferred material is, however, a reclaimed cellulosic pulp obtained by beating scrapped papers into fluffy state in view of the outstanding inexpensiveness and availability in large quantities.

The organic fibrous material is first blended with the gel-like aluminum hydroxide sludge. When difficulties are encountered in uniformly blending these materials depending on the proportion of these materials, it is optional to add certain volumes of water to facilitate blending. In this blending with the organic fibrous material, the amorphous aluminum hydroxide in the gel-like sludge coagulates and entrammels the fibers of the organic fibrous material serving as a kind of binder agent for the fibers. It has been unexpectedly discovered that the velocity of this coagulation of the amorphous aluminum hydroxide is largely dependent on the value of pH of the aqueous portion of the mixture. For example, the pH of the sludge as blended with the organic fibrous material is usually in the range of 6 to 7 so that coagulation of the amorphous aluminum hydroxide takes place prematurely and the fibers of the organic fibrous materials are entrammeled by the coagulated aluminum hydroxide only insufficiently.

Accordingly, the inventors have conducted investigations to find a way for obtaining an entrammeled state of the fibers with reliability and reproducibility and arrived at a discovery that satisfactory entrammeled state is obtained when the pH of the blend of the organic fibrous material and the gel-like aluminum hydroxide sludge is controlled in a wealky acidic region of 4 to 6 or, preferably, 4 to 5.5 by adding a small amount of an acid. The acid used for this purpose is not particularly limitative but sulfuric acid and phosphoric acid are preferred. In such a weakly acidified medium, the coagulation of the gel-like amorphous aluminum hydroxide is somewhat retarded so that coagulation thereof takes place only after the fibers have been sufficiently entrammeled by the amorphous aluminum hydroxide.

When the entrammeled state of the organic fibers is established in the blend in the above described manner, the powdery aluminum hydroxide is added thereto and well blended together. This powdery aluminum hydroxide is, as is mentioned before, obtained by drying and pulverizing the gel-like sludge of the amorphous aluminum hydroxide. The sludge may be air-dried in the open air but it is recommendable to accelerate drying with heating when the cost of the energy for heating is not so high as in the utilization of waste heat. The amorphous aluminum hydroxide thus dried up is then pulverized by means of a suitable pulverizing machine such as ball mills, hammer mills and the like. It is preferable that the pulverized aluminum hydroxide is passed through screens of suitable mesh openings to remove unduly coarse particles in order to ensure good workability of the blend and excellent performance of the inventive spray-on insulating material. Preferable particle size distribution is obtained by removing coarse particles not to pass a screen of 100 mesh opening in the Tyler standard mesh series. Best results are obtained when the powdery aluminum hydroxide contains substantially no coarse particles having a diameter exceeding 10 $\mu$m.

When the above described conditions are followed, the resultant blend of the organic fibrous material, gel-like aluminum hydroxide sludge and the powdery aluminum hydroxide is imparted with improved filtrability and water-permeability so that it is relatively easily dried and disintegrated into fluffs subsequently. The dried blend prepared as described above is readily disintegrated into fluffs by use of a suitable machine such as a willower and used as a spray-on insulating material according to the present invention.

When the inventive spray-on insulating material is used for the insulation of the ceiling, the material is sprayed or blown as such into the garret by use of a blower gun so that the material deposits on the ceiling board in a desired thickness. The thus formed layer of the inventive material has a good stability owing to the unique structure composed of the powdery aluminum hydroxide encaged in the network of the organic fibers which in turn are entrammeled by the gel-like amorphous aluminum hydroxide serving like an adhesive. Notwithstanding the use of the organic fibrous material as the reinforcing component, the inventive spray-on insulating material has a high non-inflammability and flame retardancy owing to the presence of the large amount of the aluminum hydroxide as is understood from the fact that powdery aluminum hydroxide is widely used as a flame retardant filler in various kinds of plastic materials. Needless to say, the coefficient of heat conductivity of the inventive insulating material is sufficiently low to ensure good heat insulation though dependent on the degree of compaction of the insulating layer. For example, the coefficient of heat conductivity of a layer formed of a typical material of the invention compacted to have a bulk density of 0.78 g/cm$^3$ was 0.066 kcal/m.hr.°C.

As is described in the above, the inventive spray-on insulating material may be blown as such when the insulating layer formed with the inventive material is on the ceiling. It is desirable, however, that the inventive spray-on material is sprayed or blown together with an adhesive agent when the insulating layer is to be formed on a vertical wall or on the downward surface of the ceiling in order to prevent falling off of the once formed insulating layer from the surface by virtue of the binding power of the adhesive. The blower nozzle for carrying out such a mixed blowing is designed such that the inventive insulating material is blown out of the center opening of the nozzle while the adhesive is sprayed from the openings surrounding the center opening so that the inventive material impinges at and deposits on the wall with entrainment of the adhesive.

Various kinds of adhesives are suitable for the purpose but acrylic and ethylene-vinyl acetate copolymeric adhesives are preferred. These adhesives are used preferably in a form of an aqueous emulsion because the use of organic solvents is highly undesirable in a building due to the danger of fire or explosion as well as the health problem of the workers. The amount of the adhesive relative to the inventive insulating material should be carefully controlled since no satisfactory binding effects are obtained with a too small amount of the adhesive while the use of an excessive amount of the adhesive results in consolidation of the insulating layer with increased coefficient of heat conductivity.

Following are the examples to illustrate the invention in further detail.

EXAMPLE 1

Into a vessel were introduced 20 kg of a gel-like aluminum hydroxide sludge containing about 4 kg of amorphous aluminum hydroxide and 20 kg of a reclaimed pulp obtained by beating scrapped newspaper and the pH of the blend was adjusted to 4.5 by adding a small amount of sulfuric acid with an additional volume of water to facilitate blending of the mixture. The cellulosic fibers of the pulp became entrammeled by the aluminum hydroxide content in the sludge as the blending was continued.

Separately, a powdery aluminum hydroxide was prepared by drying the same gel-like aluminum hydroxide sludge as used above and pulverizing the dried material by use of a ball mill followed by screening to have a particle size distribution to pass through a 200 mesh screen.

The blend of the cellulosic pulp and the sludge was then admixed with 76 kg of the powdery aluminum hydroxide and well blended. The blend was dried in a hot air circulating oven at 80° C. and then disintegrated into fluffs by use of a willower machine.

The above prepared fluffy material was blown with a blower into the garret of a building to deposit and form a layer of about 10–15 mm thickness on the ceiling board. The layer was sufficiently resistant against picking and the bulk density and the coefficient of heat conductivity of the layer were about 0.2–0.4 g/cm$^3$ and 0.04–0.06 kcal/m·hr.°C., respectively.

EXAMPLE 2

The fluffy material prepared in Example 1 was blown at a vertical wall together with an aqueous emulsion of an acrylic adhesive resin diluted to a solid content of 20% by weight by use of a blower equipped with a double-nozzle gum. The blowing rate of the adhesive was about 15–30% by weight calculated as solid based on the blown amount of the fluffy material.

The layer formed on the wall had about 10–15 mm thickness after complete drying and was quite safe from falling off from the wall. The bulk density and the coefficient of heat conductivity of the thus formed and dried insulating layer were about 0.2–0.4 g/cm$^3$ and 0.04–0.06 kcal/m·hr.°C., respectively.

What is claimed is:

1. A spray-on insulating material for building which comprises an organic fibrous material, gel-like amorphous aluminum hydroxide sludge entrammeling the fibrous material and powdery aluminum hydroxide which is a dried and pulverized material of a gel-like aluminum hydroxide sludge and uniformly blended with the organic fibrous material entrammeled with the amorphous aluminum hydroxide.

2. The spray-on insulating material for building as claimed in claim 1 comprising from 15 to 25% by weight of the organic fibrous material, from 3 to 5% by weight of the gel-like amorphous aluminum hydroxide sludge as dried and from 70 to 80% by weight of the powdery aluminum hydroxide.

3. The spray-on insulating material as claimed in claim 1 wherein the organic fibrous material is a cellulosic pulp of fibers obtained from scrapped papers.

4. A method for manufacturing a spray-on insulating material for building which comprises
   (a) mixing an organic fibrous material with a gel-like amorphous aluminum hydroxide sludge,
   (b) adjusting the pH of the mixture of the organic fibrous material and the gel-like amorphous aluminum hydroxide sludge to 4 to 6 by adding an acid,
   (c) admixing a powdery aluminum hydroxide which is a dried and pulverized material of a gel-like amorphous aluminum hydroxide sludge to the mixture of the organic fibrous material and the gel-like amorphous aluminum hydroxide sludge,
   (d) drying the blend obtained in the step (c), and
   (e) disintegrating the dried blend into fluffs.

5. The method as claimed in claim 4 wherein the amounts of the organic fibrous material, the gel-like amorphous aluminum hydroxide sludge and the powdery aluminum hydroxide in the blend are from 15 to 25% by weight of the first, from 3 to 5% by weight of the second as dried and from 70 to 80% by weight of the third, respectively.

6. The method as claimed in claim 4 wherein the organic fibrous material is a cellulosic pulp of fibers obtained from scrapped papers.

7. The method as claimed in claim 4 wherein the acid used in step (d) is sulfuric acid or phosphoric acid.

* * * * *